(12) United States Patent
Leow et al.

(10) Patent No.: US 8,638,354 B2
(45) Date of Patent: Jan. 28, 2014

(54) IMMERSIVE VIDEO CONFERENCE SYSTEM

(75) Inventors: Chon Hock Leow, Menlo Park, CA (US); Thinh Bui, Fremont, CA (US)

(73) Assignee: Creative Technology Ltd, Singapore (SG)

( * ) Notice: Subject to any disclaimer, the term of this patent is extended or adjusted under 35 U.S.C. 154(b) by 165 days.

(21) Appl. No.: 12/896,808

(22) Filed: Oct. 1, 2010

(65) Prior Publication Data

US 2012/0081503 A1    Apr. 5, 2012

(51) Int. Cl.
*H04N 7/14*        (2006.01)

(52) U.S. Cl.
USPC ........................................ 348/14.01; 370/260

(58) Field of Classification Search
USPC ............................ 348/14.01–14.11; 455/416; 379/201.01–218.01; 725/62, 106, 133, 725/141, 153; 370/260–271
See application file for complete search history.

(56) References Cited

U.S. PATENT DOCUMENTS

| 5,953,053 | A  | * | 9/1999  | Chen et al.      | 348/14.16 |
|-----------|----|---|---------|------------------|-----------|
| 7,209,160 | B2 | * | 4/2007  | McNelley et al.  | 348/14.16 |
| 8,390,718 | B2 | * | 3/2013  | Robinson et al.  | 348/333.02|
| 8,489,149 | B2 | * | 7/2013  | Lee              | 455/566   |
| 2004/0257473 | A1 | * | 12/2004 | Miyagawa      | 348/571   |
| 2009/0122951 | A1 | * | 5/2009  | Tobita         | 377/68    |
| 2010/0188478 | A1 | * | 7/2010  | Robinson et al.| 348/14.16 |
| 2010/0315481 | A1 | * | 12/2010 | Wijngaarden et al. | 348/14.07 |

* cited by examiner

*Primary Examiner* — Maria El-Zoobi
(74) *Attorney, Agent, or Firm* — Creative Technology Ltd

(57) ABSTRACT

A preferred embodiment of a video conferencing system that may employ a video camera capable of capturing a view approximating 360 degrees, a viewing screen positioned to allow natural eye contact between conference participants, and a processing module capable of receiving and processing multiple data streams from video and audio capturing devices as well as data streams from other sources. In some embodiments, the video camera may be mounted above or below the viewing screen to capture an approximately 360 degree view of all locally appearing participants as well as the surrounding conference environment. The video conferencing system allows multiple participants participating from a single location to communicate easily and maintain natural eye contact with one another while maintaining eye contact with persons appearing from remote locations.

15 Claims, 6 Drawing Sheets

LOCAL                                              REMOTE

LOCAL REMOTE

IMMERSIVE VIDEO CONFERENCE SYSTEM

FIELD OF INVENTION

This invention relates to video conferencing systems and, more specifically, to a system incorporating a camera capturing a perspective view of approximating 360 degrees, as well incorporating one or more viewing screens positioned to allow a more natural eye level viewing perspective of and between video conference participants.

BACKGROUND

Video conferencing is an established method of collaboration between remotely located participants. Such systems now enable audio and/or video conferencing of multiple parties over packet-switched networks, such as the Internet. Using these systems, participants may simultaneously transmit and receive audio and/or video data streams. Typically, a conference server receives audio and/or video streams from the various participating sources (cameras, general computer devices such as pc's and laptops, as well as other sources), mixes the streams and retransmits the mixed streams to conference participants appearing from a remote location. At the same time, the conference server receives audio and/or video streams from remote sources and projects them on one or more screens for viewing by locally appearing participants. These video conferencing systems implement software along with a variety of cameras, viewing screens and other audio/video capturing devices.

Most existing video conference systems utilize standard limited perspective video cameras which provide a very narrow field of view to the remote participant. Such cameras can be used effectively for video conferences between individuals. Many systems, for example, employ laptop computers having a single narrow field video camera attached to a flat back projection screen. Each participant sees the other participant on his/her own screen. But using such standard narrow field video cameras to capture multiple participants appearing in a single location can be problematic. For example, using a single standard camera in a conference room or class room with multiple participants makes it difficult for the remote participant to see all locally appearing participants clearly. And locally appearing participants will have to turn their heads away from the camera to communicate with one another. For this reason, several applications built for multiple participants appearing together employ multiple cameras. For example, some video conferencing systems employ a separate camera for each participant. Still, positioning of multiple cameras creates difficulty for those participants appearing together to communicate effectively with one another because they often need to be positioned side-by-side in order to be facing the camera and not in the round as they would be positioned at a conference table where they can easily see one another.

Most existing video conference systems also utilize standard flat display screens for viewing. For individuals appearing remotely, for example, laptop view screens are often utilized. This works reasonably well because individual participants are only communicating with one other remote participant—they don't need to communicate with other participants in a single location. But, in larger conference room or class room settings with multiple participants appearing in a single location, large flat display screens for viewing are often employed at a single location (for example, at one end of the room) for all to see. This is problematic because it requires participants to turn away from one another and toward the display (i.e. viewing) screen to see remotely appearing participants. Dedicated video conferencing centers will often position locally appearing participants side-by-side in front of one or more larger screen displays. This way they are more easily seen by remotely appearing participants, but they tend to have difficulty communicating with one another because they have to turn their heads toward one another to talk or pick up non-verbal gestures. In all, current systems create a very unnatural setting for participants appearing together.

Current video conferencing systems try to alleviate the problems. These systems tend to be expensive because they employ multiple cameras and multiple screens and/or they are difficult to set up. And it is common for many individuals and companies to employ larger dedicated conferencing centers for remote conferencing because the equipment is too expensive to own and/or they do not have the proper space for the equipment in their own offices. Further, video conferencing among multiple participants at a single natural informal setting (such as an outdoor setting) is rarely done because equipment is too heavy to move and carry.

Attempts have been made to utilize a 360 degree camera within video conferencing systems to allow broadcast of images showing multiple participants and/or contextual information to remote participants. For example, U.S. application Ser. No. 10/223,021, discloses a video conferencing system utilizing a 360 degree camera and video controller system which automates the process of determining the current speaker in virtual video teleconference by capturing and transmitting a 360 degree view as well as data suggesting the portion of the relevant 360 degree field of the current speaker. This gives the remote participant the opportunity to choose a preferred selected portion of the 360 degree view provided. The ability to select the view is the primary idea behind that system. While the system allows participants to sit together around a conference table, it still requires that they look away from one another and the camera in order to view the display screen.

Various 360 degree cameras have been deployed to enhance the video images broadcast to the remote user. For example, an omni-directional camera design for video conferencing is disclosed in U.S. Pat. No. 7,298,392 B2. The camera allows for higher pixel resolution to produce clearer images of meeting participants sitting or standing around a conference table or positioned in distant range. The system does not, again, solve the issue of participants having to turn their heads to look at a viewing screen placed at one or other sides of the conference table or room. And the application and camera design is expensive and complex in requiring that multiple images be stitched together before it is transmitted to the remote participant(s).

Attempts have also been made to enhance eye-contact between remote participants by utilizing cameras positioned behind see-through screens to more accurately capture a participant's face and align eye contact between remotely appearing participants. For example, U.S. patent application Ser. No. 11/496,805, discloses such a system employing one or multiple cameras which capture images of a participant through a see-through screen. The system does not account for multiple participants appearing in a single location. The camera is positioned on one side of the screen and the participant on the other. And the system is designed specifically to aid alignment of eyes between remotely appearing participants. There is no accommodation for enhancing communication between multiple participants appearing at a single location.

It is desirable, therefore, to have a video conferencing system which allows the positioning of the viewing screen and video camera such that conference participants may maintain natural eye contact with one another as well as with persons appearing from remote locations.

SUMMARY OF THE INVENTION

The problem of maintaining an video conferencing environment whereby multiple participants participating from a single location can communicate easily and maintain natural eye contact with one another while maintaining eye contact with persons appearing from remote locations is solved by the present system incorporating a viewing screen positioned to allow natural eye contact between participants and a camera which captures an approximate 360 degree view of the participants and conference room environment.

A preferred embodiment employs a video camera capable of capturing a view approximating 360 degrees, a viewing screen positioned to allow natural eye contact between conference participants, and a processing module capable of receiving and processing multiple data streams from video and audio capturing devices (such as video cameras) as well as data streams from other sources (such as pc's or laptops). In some embodiments, the video camera may be mounted above or below the viewing screen to capture an approximately 360 degree view of all locally appearing participants as well as the surrounding conference environment. The viewing screen may be portable and translucent to allow viewing from all sides. The processing module may stand alone or may be contained within the camera device and capable of receiving, processing and transmitting data streams received from multiple sources including the 360 degree camera, other video/audio transmitting devices (such as other video cameras, pc's or laptops) and data streams received from remote locations via network. The processing module may also be capable of selecting and transmitting data streams to be projected onto the viewing screen as well as transmitted to remote participants via a network. In such preferred embodiment, a portable projection camera may be employed to project images onto the translucent screen which can be seen from all sides by conference participants.

The inventive conferencing system allows multiple participants appearing at a single conference location to be positioned more naturally within a conference setting, such as around a conference table, so that they may easily maintain eye contact with one another as well as with the images on the viewing screen. Images of remote participants may be received and displayed on the viewing screen near the video camera such that participants may make more natural eye contact with participants appearing remotely. Further, persons appearing remotely may be provided with a view approximating 360 degrees which includes images of conference participants as well as the conference environment.

DETAILED DESCRIPTION

Reference will now be made in detail to various embodiments in accordance with the invention, examples of which are illustrated in accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail that would unnecessarily obscure aspects of the invention.

Figure 1:
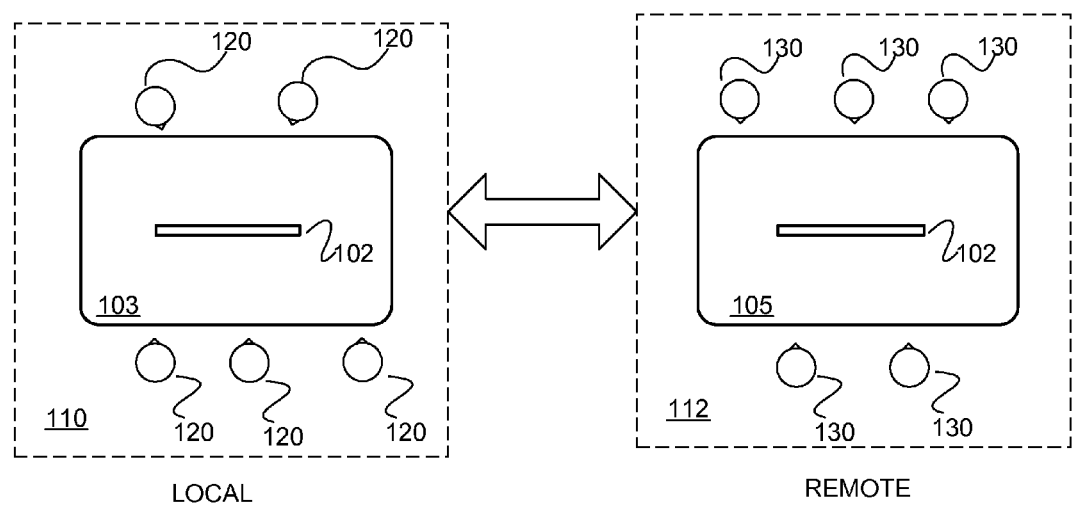
FIG. 1 is a diagram showing participants appearing at a local conference room and participants appearing at a remote conference room.

FIG. 1 is a diagram showing multiple participants 120 appearing together at one local conference location 110 connected via network with multiple participants 130 appearing at another remote conference location 112. The projection screen 102 may be placed on a conference table (103 or 105) at the respective locations.

Figure 2:
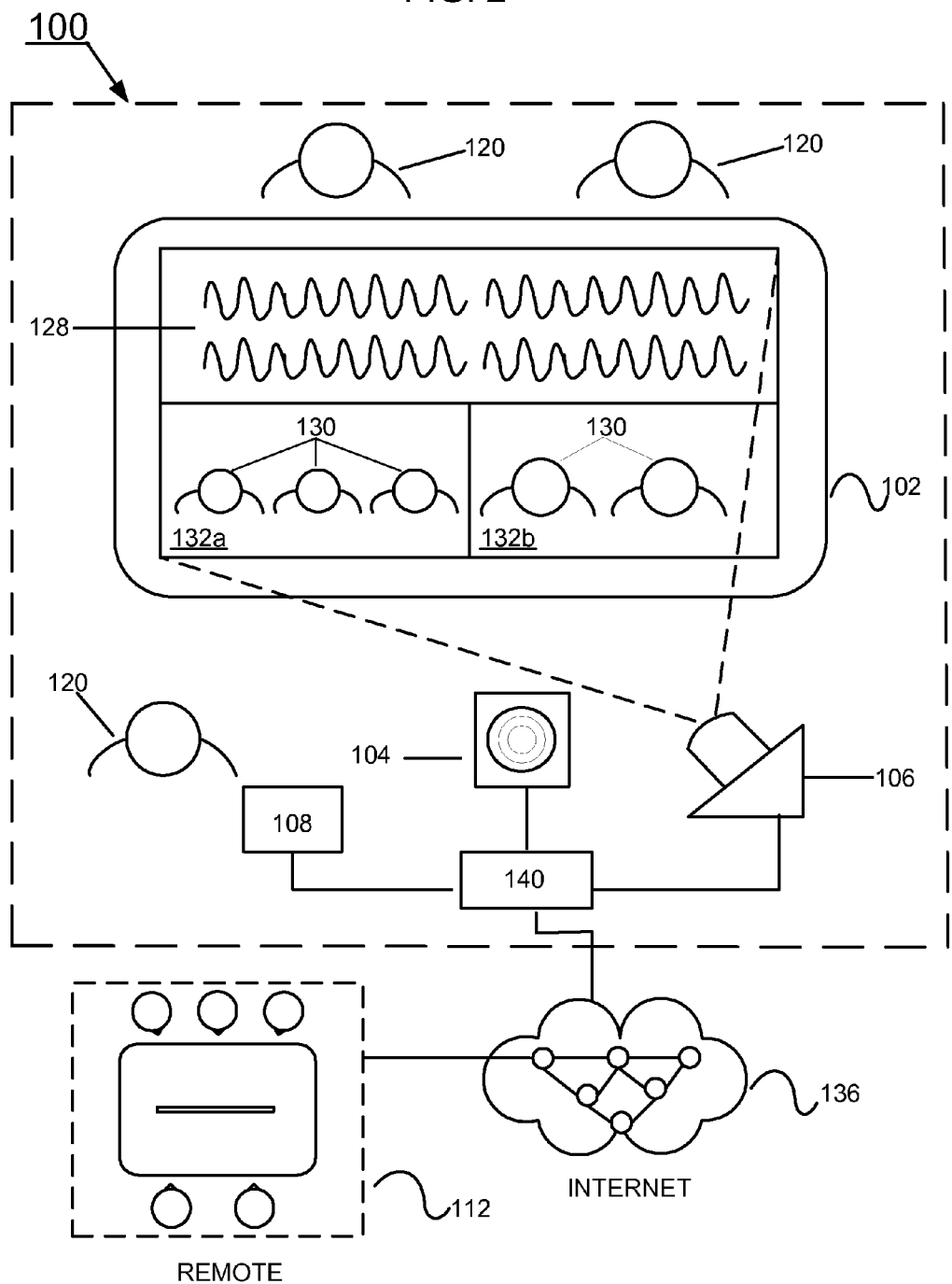
FIG. 2 is a perspective view of an exemplary video system in accordance with various embodiments of the invention.

FIG. 2 shows one example embodiment of the video conferencing system 100 being utilized at a single local conference location. In this embodiment, the system 100 utilizes a single translucent viewing screen 102 which is positioned between multiple locally appearing participants 120 sitting around a conference table. Alternative embodiments of the viewing screen 102 could include two or more back-to-back facing flat panel displays instead of the single translucent screen 102 as shown. The viewing screen(s) are positioned between participants 120 such that each participant is able to view the screen as well as easily maintain eye contact with other participants positioned on either side of the viewing screen 102.

In the embodiment demonstrated in FIG. 2, a video camera 104 capable of capturing a view which approximates 360 degrees is positioned preferably above or below the viewing screen 102. The video camera 104 may have a single fish-eye lens which is capable of capturing a 360 degree image or, alternatively, may have more than one lens and capturing multiple images which may be spliced together to approximate a 360 degree view. The video camera 104 is positioned such that it is capable of capturing images and/or audio of locally appearing participants 120 as well as the surrounding conference environment. In the embodiment shown, the video camera 104 is positioned directly below the viewing screen 102 but may, alternatively, be positioned above or to one side of the screen 102 as long as the video camera 102 it is positioned relatively close to where the images of remote participants 132a and 132b are likely to be projected on the viewing screen 102. The positioning of the camera 104 near the projected images 132 allows for simulation of natural eye contact between locally appearing 120 and remotely appearing 130 participants. The video camera 104 captures the images of locally appearing participants 120 as they look towards images 132a and 132b of remotely appearing participants displayed on the screen. The positioning of the viewing screen 102 and the video camera 104 allow local participants to maintain more natural eye contact with one another while maintain more natural eye contact with remote participants 130. Preferably the camera is mounted relative to the viewing screen 102 such that it captures images of the local participants but does not capture an image of the images (such as 132*a* and 132*b*) shown on the screen 102, As shown in FIG. 2, the video conferencing system 100 includes a processing module 140 capable of receiving, processing, and transmitting data streams from one or more devices. It is connected to the 360 video camera 104 and may be connected to other devices 108 such as a VCR, camera or other image hosting device (such as a pc or laptop). It is also connected to and capable of receiving and transmitting data (including images and audio) through a network (such as a phone line or Internet). In this case, the processing module 140 receives video images 132 transmitted from remote participants and causes those images 132 to be displayed on the viewing screen 102 along with other images 128 (such as slides or document images) received from other devices 108. The processing module 140 is capable of receiving, processing and transmitting data (such as images received from the 360 degree camera as well as other images (such as slides or document images) received from other devices 108 to remote participants 130 via network 136.

As shown in FIG. 2, images of remote participants 132 are projected onto the viewing screen 102 utilizing a portable projection device (i.e. projector) 106 such that the images 132 of remote participants appear near the location of the 360 degree video camera 104. Other images 128 (such as slides and documents) are also projected onto the screen. The positioning of the viewing screen 102 between local participants 120 allows local participants 120 to more easily maintain eye contact with one another. In this instance the viewing screen 102 is preferably not so high as to block the views of local participants with one another. In one embodiment, for example, the viewing screen 102 is a laptop configuration with a fold out translucent screen. In an alternative embodiment, the viewing screen 102 is a translucent screen which may be stored and transported as a scroll. The viewing screens 102 may be positioned such that the top of the screen is just below eye level (for example, by two or three inches) to allow participants sitting across the screen from one another to easily maintain eye contact with one another as well as view the screen. The positioning of the 360 degree video camera 104 near where images 132 of remote participants are displayed on the viewing screen 102 allows local participants 120 to be looking into or near the video camera lens while looking at images of remote participants 132. In this way, more natural eye contact is established between local 120 and remote 130 participants. Other images 128 (such as slides or document images) may be displayed on the viewing screen 102 and shared (via network transmission) between local 120 and remote 130 participants. This allows each participant to look toward one another, toward images of remote participants and toward other images 128 at the same time thus improving overall ease of communication.

Note that in one embodiment of the system illustrated in FIG. 2, participants 120 have the option of determining what portion or portions of the 360 degree camera 104 image are to be displayed on the viewing screen 102. Likewise, a determination can be made as to what number or portions of other images 128 received from other devices 108 (such as cameras, pc's or laptops) are displayed on the screen.

By utilizing a single translucent viewing screen 102, as depicted in FIG. 2, and projecting the images received from the processing module 140 on the screen using a portable projection device (106), the participants sitting on opposite sides of the screen will be seeing reversed images. While reversed images of remote participants 132 are unlikely to alter the ability of participants to communicate with one another, reversed images of other images 128 (such as slides or documents containing text) will likely make it difficult for participants seeing the reversed images to effectively participate. Accommodations can be made by enabling the processing module to provide projection of forward and reversed images onto the viewing screen such that participants viewing from each side of the translucent viewing screen 102 can easily read or interpret those images.

In alternative embodiments, the single translucent viewing screen as shown in FIG. 2 could be replaced by two or more projection flat screens (such as flat panel screens) which are placed back-to-back and controlled by the processing module 140. This embodiment would prevent the need for reversing images. Other embodiments of the invention could include translucent screens which allow high contrast at ambient light levels for normal work environments and sufficient transparency to allow persons seated on opposite sides of the screen to see one another clearly without having to move over or around the screen. In various embodiments the viewing screen 102 can be, but is not limited to, a scroll, a planar surface, a curved surface, a non-planar surface, a cylinder shape, a closed loop shape, any type of shape, or any type of surface.

As previously noted, the embodiment shown in FIG. 2 employs a portable video projector 106 to project data (i.e. images) received from the processing module 140 onto the viewing screen 102. The projector 106 may be an easily portable projector capable of projecting images onto an opaque viewing screen 102 or onto other viewing locations (such as a wall or non-opaque viewing screen). The projector 106 may also be fixed or incorporated into another device (such as the viewing screen 102). It is connected to the processing module 140 which processes the images received from one or more sources (whether they be the 360 degree camera 104 or other sources 108) and enables the projector to project those images onto the viewing screen 102 or other location. In this way the projector 106 allows numerous options for viewing in different settings.

Within the embodiment of the video system 100 as shown, it is noted that the processing module 140 is capable of performing a wide variety of functions. For example in various embodiments, the processing module 140 can determine, select and/or activate which image received from the variety of image capturing devices is projected onto the viewing screen and in which position such images appear on the screen. Furthermore, in various embodiments, the processing module 140 is capable of receiving, recording, and/or transmitting the captured audio and video streams output by each of the audio/video capturing devices (104, 108). Moreover, in various embodiments, the processing module 140 can perform operations associated with the different utilizations for the elements of the video conferencing system 100, described herein. It is appreciated that the processing module 140 can be implemented as software located on a general purpose computer (such as a pc or laptop) or implemented as a processing chip housed within the camera 104, or other device 108, but is not limited to such.

Within FIG. 2, it is understood that in various embodiments, the conferencing system 100 can include more or less than the two video capturing devices shown as shown (104, 108). In various embodiments, the video system 100 can include at least two video capturing devices (e.g. 104, 108), but it is not limited to such.

Within FIG. 2, it is noted that the elements of system 100 are not limited to use during video conferencing and/or remote collaboration. That is, different combinations of the elements of system 100 can be utilized in a wide variety of ways. For example in various embodiments, the viewing screen 102, projector 106 and the video camera 104 can be utilized for, but not limited to, movies, games, interactive games and the like.

Figure 3:
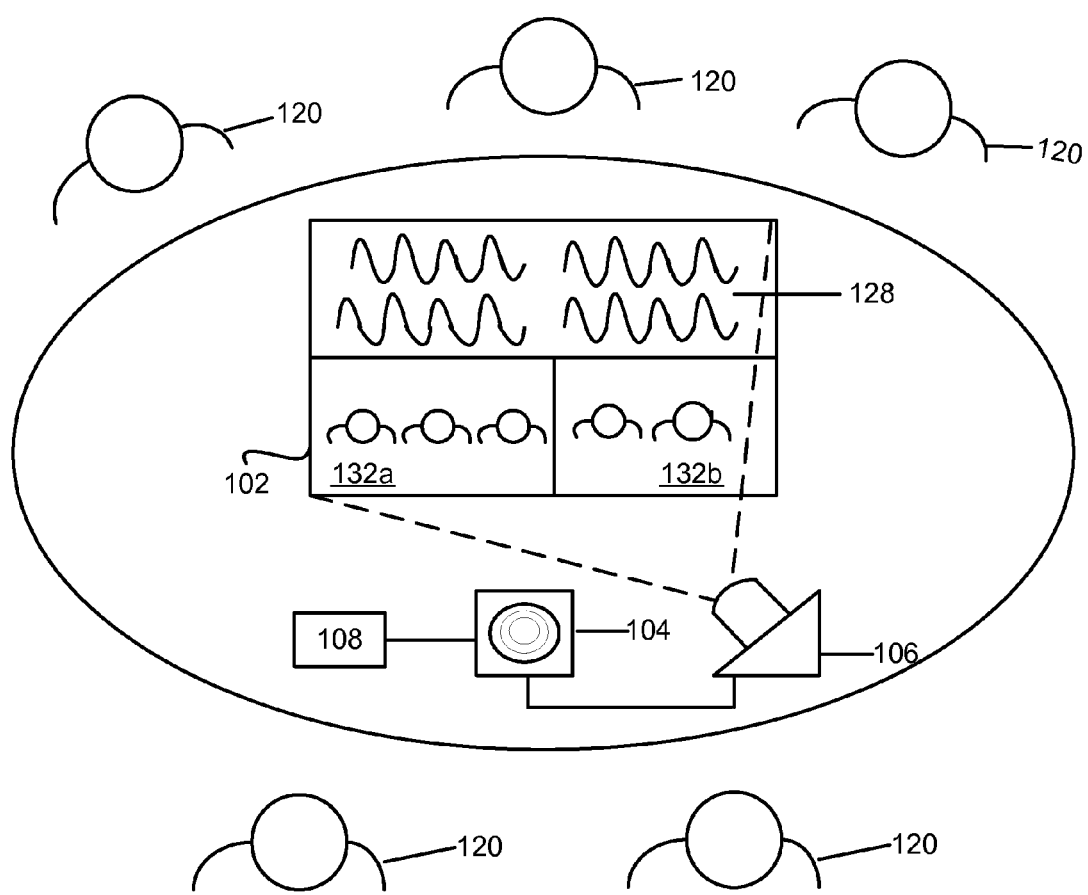
FIG. 3 is a top view of an exemplary video system in accordance with various embodiments of the invention.

FIG. 3 is an exemplary video conferencing system 100 that includes an exemplary viewing screen 102 in accordance with various embodiments of the invention. In this case, the viewing screen is a translucent screen made of lightweight material which may be rolled into a scroll but otherwise spread out and mounted on a conference table or other support. Note that FIG. 6 includes a side-sectional view of one exemplary embodiment of a viewing screen 102 mounted between participants. It is noted that the processing module 140 may be contained within or hosted by another device such as the 360 degree video camera 104 or other device 108 (such as a laptop computer). As shown, the processing module 140 is connected to the 360 degree camera 104. The module 140 processes the images received from the camera 104 and transmits them via network connection to remote participants 130. The processor receives transmitted data 131 (not labeled in the figure) from the remote participants via network connection, processes that data and causes images 132 of the remote participants to be displayed on the viewing screen 102 using a portable projector 106. The processor receives data and images from other devices 108, processes that data, and projects selected images 128 onto the viewing screen 102.

As shown in FIG. 3, the images selected by the participants to be displayed on the viewing screen 102 include the processed images 132*a* and 132*b* received from remote participants as well as other images (such as slides and document images) 128. The processing module 140 is capable of splitting a 360 degree view of images received from remote participants and displaying one or more portions of the received images on the screen. The processing module 140 is also capable of positioning text or images received from a database or other source (such as data streams received from remote locations via network connection) on to the viewing screen 102. When persons are viewing the translucent viewing screen 102 from an opposite position, it may be necessary to flip all or portions of the text or images 128 to be projected onto the screen to allow reading or viewing by persons viewing from various positions around the screen. The processing module 140 is capable of orienting and positing the text and images to be displayed on the screen to allow optimal viewing and interpretation by all persons viewing the screen and seated on opposite side of the translucent screen 102.

Figure 4:
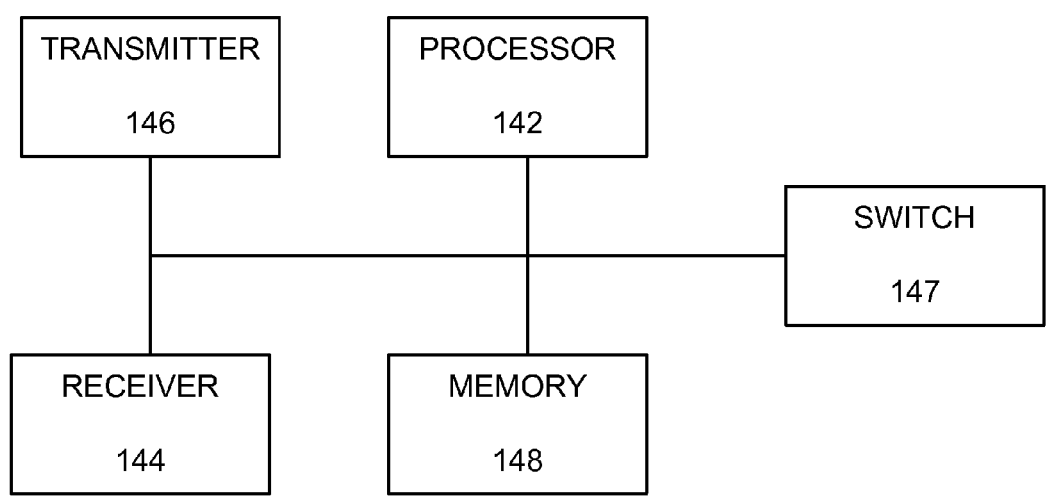
FIG. 4 is a block diagram illustrating an exemplary video processing module in accordance with various embodiments of the invention.

FIG. 4 is a block diagram illustrating an exemplary processing module 140 in accordance with various embodiments of the invention. It is noted that the video system 100 may utilize a processing module 140 similar to the processing module 140 depicted by FIG. 4, but is not limited to such. The processing module 140 can include, but is not limited to, a processor 142, a receiver 144, a transmitter 146, a switch 147, and memory 148, which together may be referred to as a module. It is understood that each component of the processing module 140 can be implemented with software, firmware, electronic hardware, or any combination thereof. Moreover, each component of the processing module can be coupled to each other. It is understood that the processing module 140 can include additional or fewer components than those shown in FIG. 4. The processing module 140 is enabled for connection to the various video and audio input devices as well as the projection apparatus. The processing module 140 may also include or be attached to, but would not be limited as such, a recording device or database.

Figure 5:
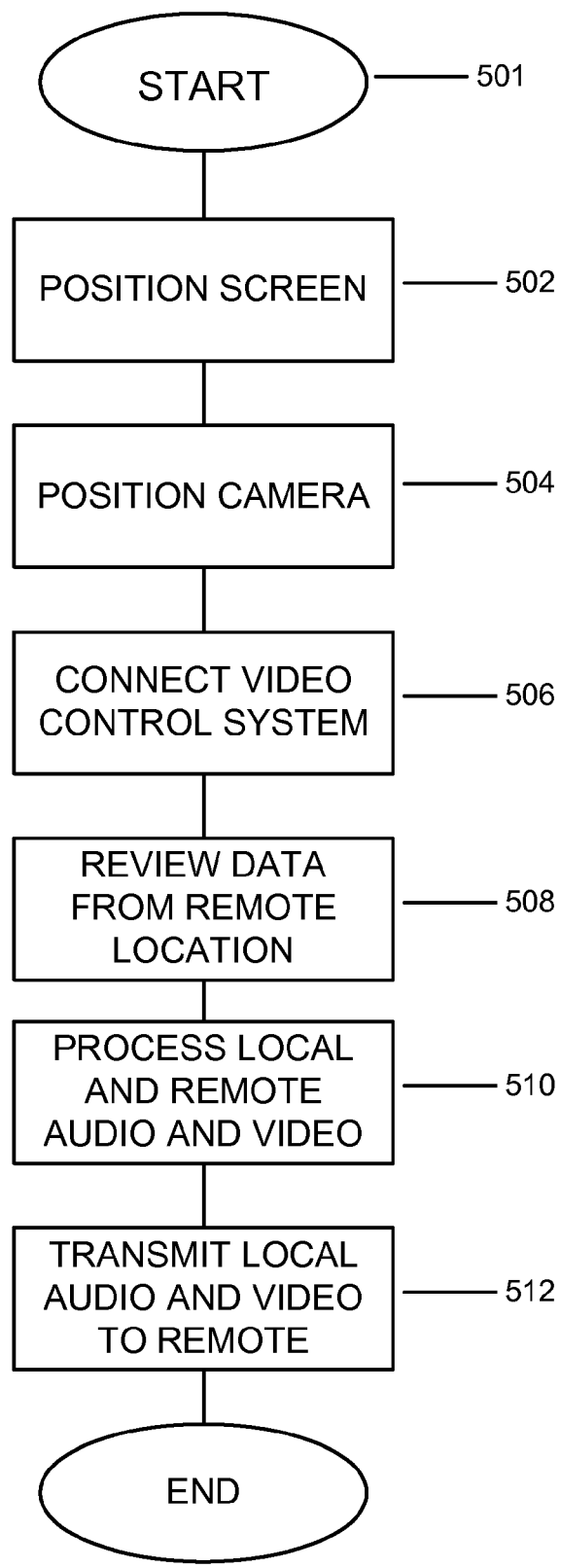
FIG. 5 is a flow diagram of an exemplary method in accordance with various embodiments of the invention.

FIG. 5 is a flow diagram of an exemplary method in accordance with various embodiments of the invention. Specifically, it is a method for capturing data including a 360 degree video image of locally appearing participants 120 and transmitting that data over a network to remote participants 130. The method also includes receiving a video image from a remote participant 130 and displaying that image on a viewing screen 102 which is positioned between local participants 120 to allow more natural eye contact between local and remote participants during a video conference.

The method depicted in FIG. 5 includes exemplary processes of various embodiments of the invention that can be carried out by a processor(s) and electrical components under the control of computing device readable and executable instructions (or code), e.g. software. The computing device readable and executable instructions (or code) may reside, for example, in data storage features such as volatile memory, non-volatile memory and/or mass data storage that can be usable by a computing device. However, the computing device readable and executable instructions (or code) may reside in any type of computing device readable medium. Although specific operations are disclosed in the method shown, such operations are exemplary. The method depicted may not include all of the operations illustrated by FIG. 5. Also, the method may include various other operations and/or variations of the operations shown by FIG. 5. Likewise, the sequence of operations of the method can be modified. It is noted that the operations of the method can be performed manually, by software, by firmware, by electronic hardware, or by any combination thereof.

Specifically, the method as described by FIG. 5 includes:

1) positioning an opaque viewing screen 102 in an easily accessible location conducive for a meeting between multiple participants 120;

2) positioning a 360 degree camera 104 (such as below the viewing screen 102) to capture audio and video images of multiple participants 120 as well as objects and other contextual information within the camera's field of view;

3) Connecting a video control system to the 360 degree camera 104, other audio/video producing sources 108, the projector 106, and to a transmission network (such as the Internet) or other transmission means (such as through phone lines or wireless means);

4) Receiving audio and/or video images transmitted from remote participants 130 via network (such as the Internet) or other transmission means (such as through phone lines or wireless means).

5) Processing audio and video images received from the 360 degree camera 104, other sources 108, as well as audio and video images 132 received from remote participants using a processing module 140;

6) Projecting the images received other sources 108 as well as audio and video images 132 received from remote participants onto the viewing screen 102 using a projection device 106 connected to the processing module 140;

7) Transmitting the audio and video images 122 (not shown) obtained from the 360 degree camera to remote participants 130 using a network (such as the Internet) or other transmission means (such as through phone lines or wireless means);

At step 1 (see reference number 502), the viewing screen 102 is positioned between locally appearing participants 120 to allow more natural eye contact and communication. The conference can take place in a variety of settings including office settings (such as at a conference table or desk) or in outdoor settings (such as on a lawn, picnic table, or other place where people can meet together).

At step 2 (504), a plurality of video capturing devices can be established or set up at or near the viewing screen 102. However, the 360 degree camera 104 is positioned to be capable of capturing audio as well as video images of each of the one or more participants appearing together in this single location. In various embodiments, the positioning of the 360 degree camera 104 can be based on the number of participants appearing together and/or the amount of contextual information relevant to the communications between participants.

At step 3 (506), the processing module can be part of a laptop or other computing device or can be located on a chip that is part of the camera or projector, or it can be separate from any other component. The video controller receives input from the various system components as well as from the remote participant and controls output of audio, video and other images.

At step 4 (508), the audio and video images 122 received from the 360 degree camera 104 and/or other sources 108 is processed by the video controller. The locally appearing participants 120 may select the content that is to be projected onto the screen and organize the playback of sound and display of images in a way that is most effective for communication with remote participants by use of software.

At step 5 (510), the data (including images and audio) received from various sources including the 360 degree camera 104, other video and audio capturing devices 108, video and/or audio streams 132 received from remote participants 130 are processed by the audio/video processing system 140.

At step 6 (512), the images received from the 360 degree camera 104 and other sources 108 as well as the audio and video images 132 received from remote participants 130 are projected onto the viewing screen 102.

At step 7 (514), the audio and/or video images 122 captured by the 360 degree camera 102 as well as other sources 108 are transmitted to remote participants 130 using a network (such as the Internet) or other transmission means such as through phone lines or wireless means.

Figure 6:
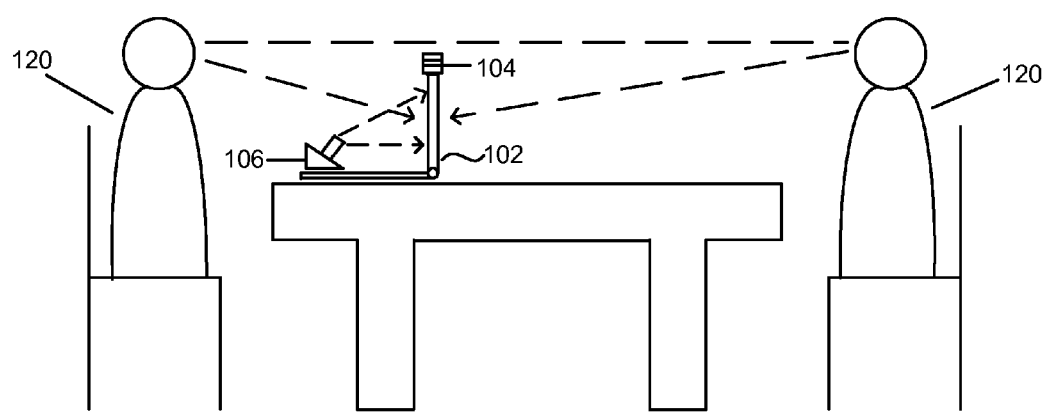
FIG. 6 is an elevation view of an exemplary video system in accordance with various embodiments of the invention.

FIG. 6 is a side-sectional view of one exemplary embodiment of the video conferencing system 100 that is in a portable laptop-like configuration. The exemplary translucent viewing screen 102 preferably folds with a hinge against the base of the laptop and may be easily positioned between two participants 120 such that the top of the viewing screen 102 is just below (for example 1 to 3 inches) eye level of the participants to allow the participants to easily maintain eye contact with one another while at the same time view the screen. In this exemplary embodiment, the projector 106 pops-up from the base portion of the laptop. And the audio/video processing system 140 (not shown) may be housed within the laptop. The 360 degree camera 104 may be mounted to the top of the viewing screen 102 to allow an unimpeded 360 view of the participants and environment surrounding the viewing screen. Preferably the 360 degree camera is mounted relative to the viewing screen such that the images on the viewing screen are not captured by the camera.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A video conferencing system comprising:
 a translucent viewing screen configured for positioning between at least two local participants said participants located on opposing sides of said viewing screen and further configured to show one or more videoconference images to the at least two local participants;
 a portable projection apparatus configured to project the images onto the viewing screen from one of said opposing sides and wherein said videoconference images are viewable from both of said opposing sides;
 a video camera or cameras having a combined viewable perspective approximating 360 degrees mounted adjacent to the viewing screen; and
 a processing module configured for receiving, processing and transmitting audio and images from the 360 degree camera as well as processing audio and videoconference images received from remote locations via network or other transmission means.

2. The video conferencing system of claim 1 wherein the top of the viewing screen is positioned to allow participants to easily maintain eye contact with one another while viewing the screen.

3. The video conferencing system of claim 1 wherein said video camera is mounted directly below said viewing screen.

4. The video conferencing system of claim 1 wherein said video camera is mounted directly above said viewing screen.

5. The video conferencing system of claim 1, wherein said processing module is hardware.

6. The video conferencing system of claim 1, wherein the processing module is software.

7. The video conferencing system of claim 1, wherein the video camera is mounted relative to the screen such that the shown videoconference images are not captured by the video camera or cameras.

8. The video conferencing system of claim 1, wherein the system and viewing screen are configured to present forward and reverse images on each of the two opposing sides of said translucent viewing screen.

9. The video conferencing system of claim 1 wherein the viewing screen and processing module are configured to display one or more videoconference images having at least two windows representing images of remote videoconference participants, each of the at least two windows corresponding to opposing sides of a viewing screen at the remote location.

10. A method for video conferencing comprising the steps of:
 positioning a translucent viewing screen between participants;
 positioning a 360 degree camera directly above or below the viewing screen;
 capturing data from the 360 degree camera;
 receiving data transmitted via network from one or more remote locations;
 processing data received from the 360 degree camera and data transmitted from one or more remote locations;
 displaying data images received from one or more remote locations on the viewing screen utilizing a portable projector positioned on one side of the translucent viewing screen, said projector and viewing screen configured to present the projected data image to participants located on two opposing sides of the translucent viewing screen; and
 transmitting data images received from the 360 degree camera to one or more remote locations via network or other transmission means.

11. The method for video conferencing of claim 10 wherein the step of displaying further comprises displaying forward and reverse data images to participants located on the two opposing sides of the translucent viewing screen.

12. A video conferencing system comprising:

a housing confirming to the general shape of a portable computer;

a translucent display coupled to the housing and configured to simultaneously present videoconference images from a remote videoconference location to at least two local participants located on opposing sides of said display;

a video camera mounted adjacent to the display and configured to capture an approximate 360 degree view of a local conference location corresponding to the local participants;

a processing module configured for receiving, processing and transmitting audio and videoconference images from the 360 degree camera as well as processing audio and videoconference images received from remote videoconference locations via network or other transmission means; and a portable projector apparatus configured to project onto the display videoconference images from the remote videoconference location.

13. The video conferencing system of claim 12 wherein the video camera is mounted relative to the screen such that the shown videoconference images are not captured by the video camera or cameras.

14. The videoconferencing system of claim 13 wherein the video camera is mounted directly below the display.

15. The videoconferencing system of claim 13 wherein the display comprises a translucent material configured for projection of forward and reverse oriented videoconference images onto one side of the display and the processing module is further configured to enable the forward and reverse oriented images to be projected onto one side of the display and which are viewable from both of said opposing sides.

* * * * *